United States Patent

[11] 3,615,164

| [72] | Inventors | Bernard S. Baker<br>Chicago;<br>Jack Huebler, Deerfield; Henry R. Linden, Hinsdale; John Meek, Deerfield, all of Ill. |
|---|---|---|
| [21] | Appl. No. | 701,036 |
| [22] | Filed | Jan. 10, 1968 |
| [45] | Patented | Oct. 26, 1971 |
| [73] | Assignees | Consolidated Natural Gas Service Company, Inc., Pittsburgh, Pa.;<br>Southern California Gas Company;<br>Southern Counties Gas Company, Los Angeles, Calif., part interest to each<br>Continuation-in-part of application Ser. No. 337,796, Jan., 1964, now abandoned. |

[54] PROCESS FOR SELECTIVE REMOVAL BY METHANATION OF CARBON MONOXIDE FROM A MIXTURE OF GASES CONTAINING CARBON DIOXIDE
11 Claims, 4 Drawing Figs.

[52] U.S. Cl. ........................................................ 23/2, 23/210
[51] Int. Cl. ......................................................... C01b 2/16, B01d 53/00, C01b 1/30
[50] Field of Search ........................................... 23/2.1, 3.1, 210, 2, 3

[56] References Cited
UNITED STATES PATENTS

| 2,747,970 | 5/1956 | Rosenblatt ................... | 23/2 X |
|---|---|---|---|
| 3,216,782 | 11/1965 | Cohn ............................. | 23/2 |

FOREIGN PATENTS

| 811,749 | 4/1959 | Great Britain ................ | 23/210 |

Primary Examiner—Earl C. Thomas
Attorney—Molinare, Allegretti, Newitt & Whitcoff ABSTRACT: A process for recovering a substantially carbon monoxide free mixture of gases particularly useful as a low-cost fuel for acid fuel cells from a mixture of gases including hydrogen, carbon monoxide, and carbon dioxide wherein the quantity of carbon dioxide is high relative to the quantity of carbon monoxide. The carbon monoxide is selectively methanated in the presence of the high proportion of carbon dioxide by heating the gaseous mixture at about 100°–220° C. in the presence of a ruthenium or rhodium catalyst on an alumina support.

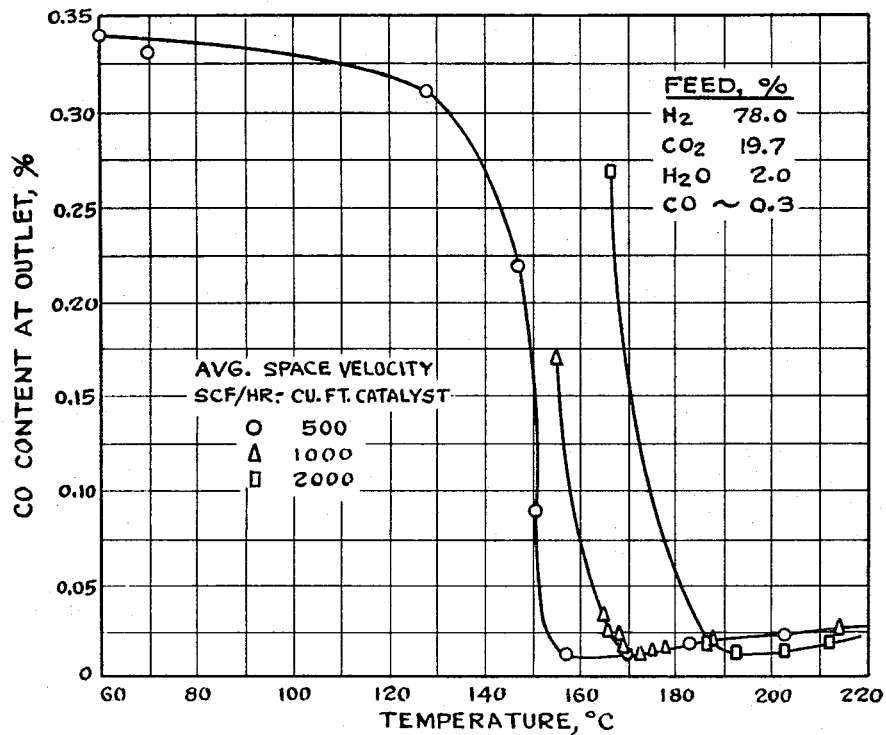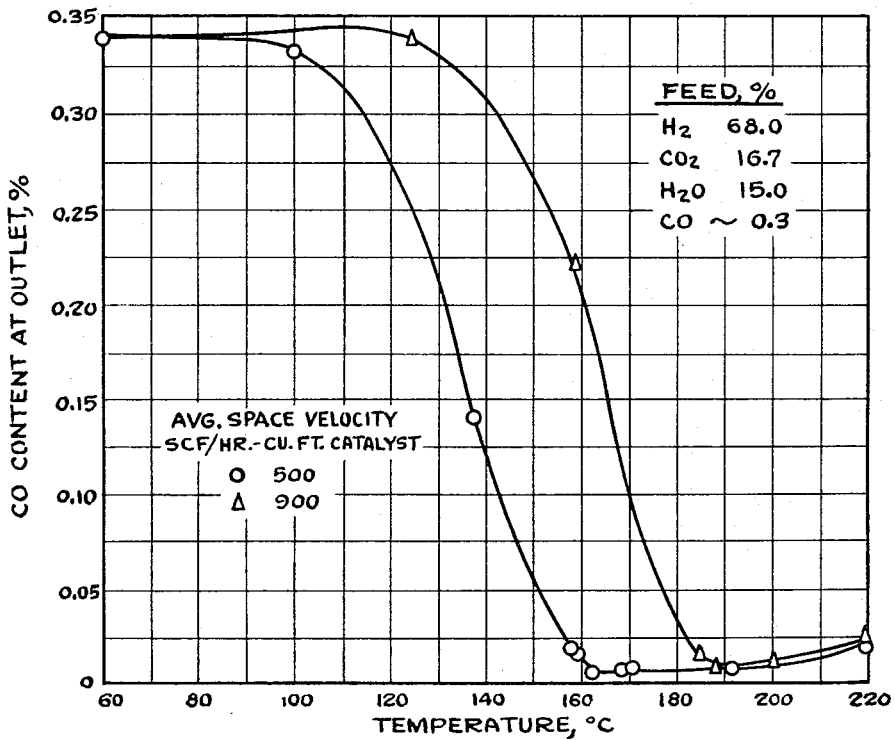

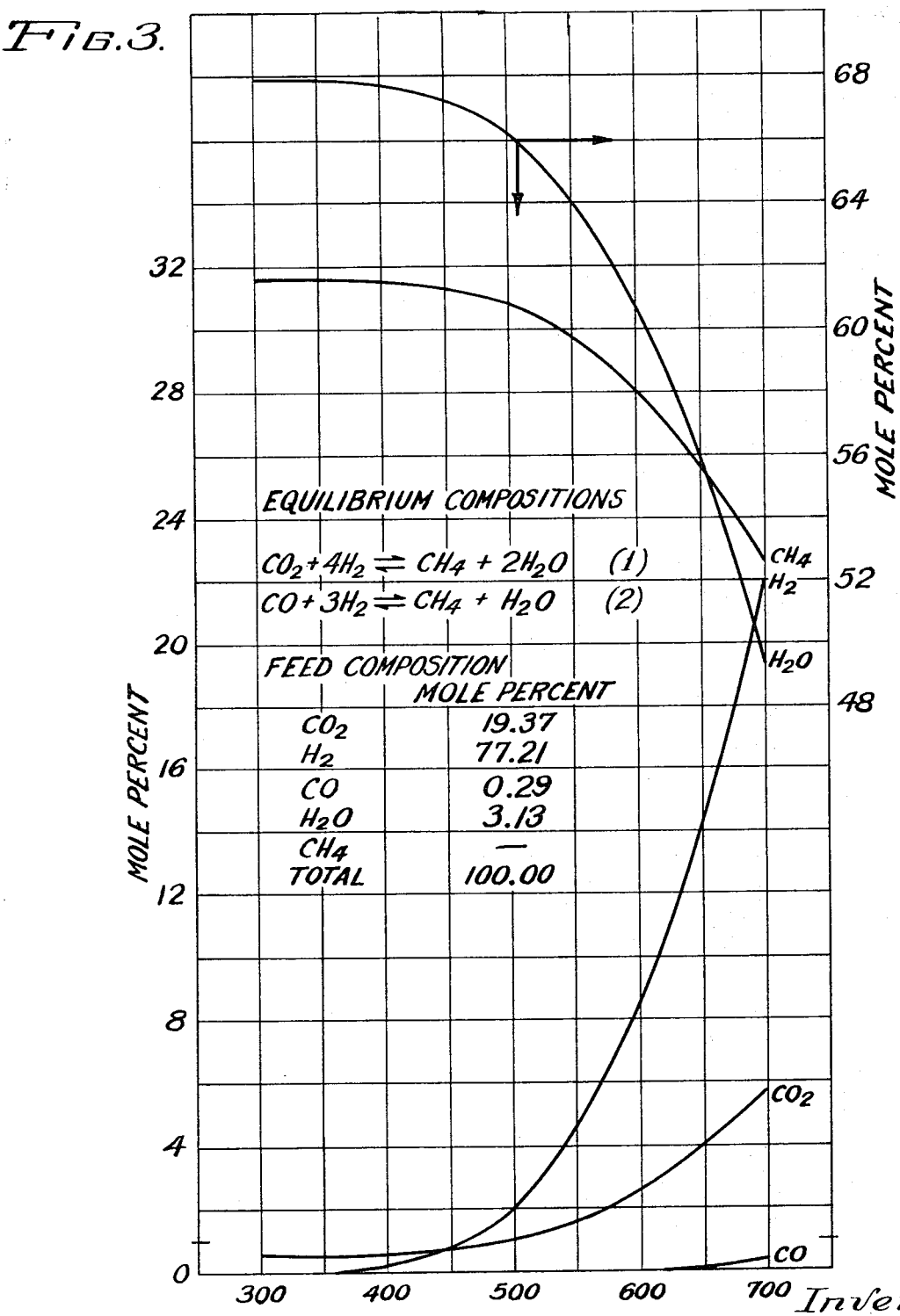

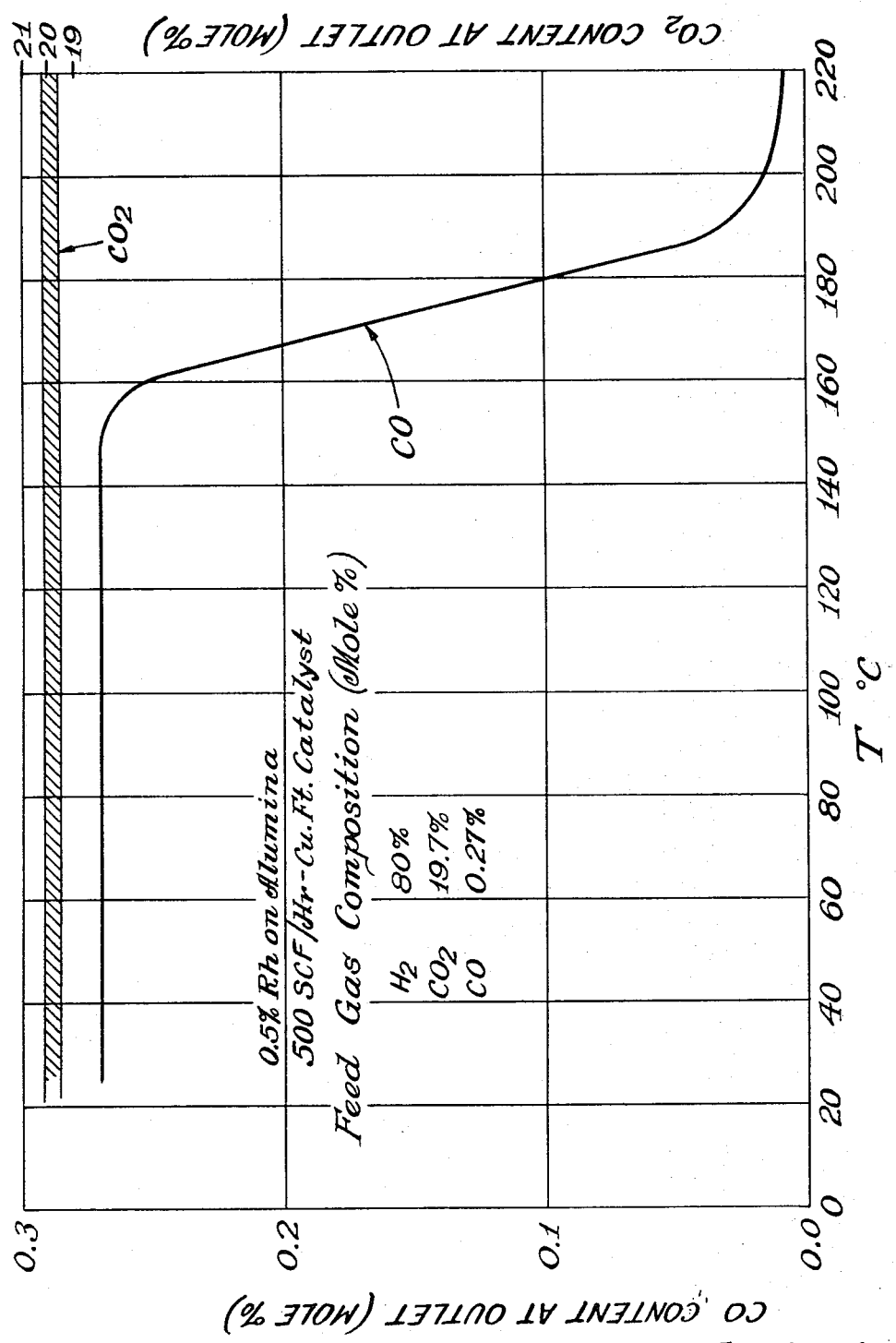

PROCESS FOR SELECTIVE REMOVAL BY METHANATION OF CARBON MONOXIDE FROM A MIXTURE OF GASES CONTAINING CARBON DIOXIDE

This application is a continuation-in-part of our copending application Ser. No. 337,796 filed Jan. 15, 1964 and now abandoned.

field and background

This invention relates to a process for the selective removal of substantially all the carbon monoxide in a mixture of gases, wherein a substantial proportion of carbon dioxide is included therein and water vapor may or may not be present, by use of a rhodium or ruthenium catalyst on an alumina support.

As is well known, gaseous hydrogen is commonly used in many industrial applications; hydrogen is particularly useful as a fuel in various fuel cell systems. One of the most commonly used types of fuel cells presently available is the hydrogen-oxygen-type fuel cell system, wherein pure hydrogen and pure oxygen are used in order to produce electrical power. Due to the excessive cost of pure hydrogen and pure oxygen, it is highly desirable that suitable substitutes be found for these fuel cell reactants. Although air has been found to be a suitable substitute for pure oxygen, the search for suitable, economical substitutes for hydrogen continues.

In searching for suitable substitutes for pure hydrogen for fuel cell use, there are at least two possible approaches. First, hydrocarbons or nitrogenous fuels e.g., ammonia or hydrazine) may be used directly in the fuel cell; and secondly, impure hydrogen, derived from hydrocarbons or nitrogenous fuels, may be utilized. The present invention is particularly directed to the second approach, that is, the use of a highly economical, impure hydrogen, which is derived from hydrocarbons or nitrogenous fuels.

It is well known that hydrogen can be recovered from many hydrocarbon fuels by any of a variety of methods; one of the most common and economical methods for production of hydrogen is by steam reforming and shift of hydrocarbons, wherein the hydrogen prepared in this manner typically contains carbon dioxide, hydrocarbon and carbon monoxide impurities. The present invention is particularly directed to solving problems associated with carbon monoxide impurities present in the hydrogen. Specifically, when carbon monoxide is present in hydrogen gas, for use in an acid fuel cell, the carbon monoxide has been found to adversely affect the operation of the fuel cell as carbon monoxide poisons the noble metal electrodes utilized by the cells.

It has been considered unfeasible to remove or substantially reduce the quantity of carbon monoxide in a mixture of gases containing hydrogen and both carbon monoxide and carbon dioxide. Known methods for the removal of carbon monoxide involve either methanation or selective oxidation of the carbon monoxide. U.S. Pat. No. 3,216,782 describes the prior art use of rhodium or ruthenium deposited from solution on ⅛ inch alumina pellets as the support to react both CO and $CO_2$ at temperatures above 200° C. and up to about 400° C. with hydrogen to form methane. At lower temperatures of 120–160°C. the CO is said to oxidize to form $CO_2$ in an oxygen-containing feed gas, rather than hydrogenate to form methane. As a side reaction to such a reaction to however, the required stoichiometric excess of $O_2$ reacts with the $H_2$ in the feed gas to form water, thus consuming hydrogen available for fuel.

An additional problem is that at the relatively high concentrations of $CO_2$ such as are involved in the feed gas used herein, both the carbon dioxide and the carbon monoxide methanate rapidly consuming the available hydrogen. Theoretical equilibrium calculations for a given feed gas composition containing about 20% $CO_2$ show that for the reactions:

$$CO_2 + 4H_2 \rightleftarrows CH_4 + 2H_2O \quad (1)$$
$$CO + 3H_2 \rightleftarrows CH_4 + H_2O \quad (2)$$

all but a small percentage (about 1 percent) of the $CO_2$ would be expected to be methanated up to about 500° K. Therefore, purification by methanation would be expected to result in excessive hydrogen consumption, and to merely produce more methane. Also, if relatively large amounts of carbon dioxide react, the exothermic reaction causes an almost complete loss of temperature control for the system. Further, as the temperature rises, more carbon dioxide is methanated and large quantities of hydrogen are used.

U.S. Pat. No. 2,747,970 discloses the use of a ruthenium or rhodium catalyst on an alumina support to methanate up to about 4% $CO_2$ in an electrolytic hydrogen at 400–410° C. Removal of CO from commercial and electrolytic hydrogen at temperatures of 120° C. and 400° C. is disclosed. Also the removal of CO in the presence of small amounts of $O_2$ is disclosed to occur at 190° C. using the same catalyst. However, there is no teaching of the selective removal of CO in the presence of a relatively high percentage of competing $CO_2$ in a feed gas. As noted from equation 1, methanation of $CO_2$ present in large amounts consumes the hydrogen desired to be used as a fuel. For example, a feed gas originally containing 20% $CO_2$, 80% $H_2$ and a trace CO, at equilibrium would be expected to contain only a small fraction of the original hydrogen; thus, selectivity is essential.

As to the selective oxidation of carbon monoxide in the presence of larger quantities of carbon dioxide, this is considered unfeasible. Other possible approaches for the purification of gaseous hydrogen, containing both carbon dioxide and carbon monoxide, are complex and prohibitively expensive.

Objects of the Invention

It is therefore an important object of this invention to provide a highly economical process for removing or substantially reducing the quantity of carbon monoxide in a mixture of gases containing hydrogen, carbon dioxide, and carbon monoxide.

It is also an object of this invention to provide a process for the purification of hydrogen containing carbon dioxide and carbon monoxide, impurities, whereby substantially all the carbon monoxide is removed so that the hydrogen is suitable for use as a fuel in an acid fuel cell.

It is a further object of this invention to provide a simplified process for the selective removal of a minor proportion of carbon monoxide from a mixture of gases containing relatively larger proportions of hydrogen and carbon dioxide, whereby the carbon monoxide impurity is removed to such an extend that the hydrogen in the mixture may be utilized as the fuel for an acid type of fuel cell.

It is another object of this invention to provide a unique process for the selective methanation of carbon monoxide in a mixture of gases containing larger proportions of carbon dioxide and hydrogen, wherein the process is characterized by its simplicity and economy of operation and the resulting gaseous mixture, containing hydrogen, is of sufficient purity to be used in an acid-type fuel cell.

It is still a further object of this invention to provide a continuous process for recovering hydrogen gas from a hydrocarbon gas, such as methane, wherein the hydrogen is sufficiently free of carbon monoxide impurities to be used in an acid-type fuel cell.

It is yet another object of this invention to provide a highly economical, continuous process for recovering hydrogen gas, substantially free of carbon monoxide impurities, from a hydrocarbon fuel by subjecting the fuel to successive reforming, shift and methanation reactions.

Further purposes and objects of this invention will appear from the following detailed description in which:

FIG. 1 is a graphical illustration of the reduction in CO content in a feed gas containing 2.0 percent water using the catalyst in accordance with this invention;

FIG. 2 graphically shows the reduction in CO content in a feed gas containing 15 percent water;

FIG. 3 graphically shows the theoretical, expected equilibrium compositions of $CH_4$, $H_2O$, $CO_2$, and CO as a function of temperature for a typical gas as used herein;

FIG. 4 graphically shows the comparative CO and $CO_2$ content of outlet gas plotted against temperature to illustrate the selective methanation and temperature ranges of this invention.

DETAILED DESCRIPTION

Generally, our process for removing or substantially reducing the quantity of carbon monoxide in a mixture of gases containing hydrogen, carbon dioxide, carbon monoxide, and which also may contain water vapor, comprises the step of heating the mixture of gases in a reaction zone having a temperature below the temperature at which the shift reaction takes place and above the temperature at which the carbon monoxide methanation reaction takes place, while conducting the process in the presence of a methanation catalyst. The input or feed gas mixture contains substantially no oxygen. The mixture of gases resulting from our process includes hydrogen, carbon dioxide, and gaseous water; little or no carbon monoxide is present in the mixture and the hydrogen recovered is of sufficient purity to be used in an acid fuel cell, without adversely affecting the operation thereof, and without the removal of $CO_2$.

Although there may be a number of reasons why it is desirous to remove carbon monoxide from a mixture of gases including hydrogen, carbon dioxide, and carbon monoxide, as previously set forth, it is particularly important that carbon monoxide be substantially removed from the gaseous mixture when the hydrogen is to be used in an acid-type fuel cell because the carbon monoxide poisons the noble metal electrodes utilized by the cells. A typical gaseous mixture to be treated by our process desirably contains approximately 3,000 p.p.m. carbon monoxide, 800,000 p.p.m. $H_2$, and 200,000 p.p.m. $CO_2$. The carbon monoxide must be removed or substantially reduced in quantity before the hydrogen can be used as a fuel for a fuel cell.

In order to substantially remove the carbon monoxide, there is preferably a methanation reaction between the carbon monoxide and the hydrogen in the gaseous mixture, which reaction is as follows:

$$CO + 3H_2 \rightleftarrows CH_4 + H_2O \quad (3)$$

However, in a hydrogen, carbon dioxide, carbon monoxide mixture of gases, it is common for other reactions to also take place during the methanation reaction between the carbon monoxide and hydrogen; these reactions are undesirable and include the following:

$$CO_2 + 4H_2 \rightleftarrows CH_4 + 2H_2O \quad (1)$$
$$CH_4 + H_2O \rightleftarrows CO + 3H_2 \quad (4)$$

The first of the undesirable reactions produces methane and consumes large amounts of hydrogen, since carbon dioxide is present in substantial amounts in the gaseous mixture. The second reaction, reaction (4), is clearly undesirable since it results in the production of more carbon monoxide. Thus, it is important to limit the reaction to the selective methanation of carbon monoxide with hydrogen, while substantially prohibiting the two undesirable reactions.

We have discovered that the desired selective methanation of carbon monoxide and hydrogen takes place despite the presence of carbon dioxide by following certain conditions during the methanation. The mixture of hydrogen, carbon dioxide and carbon monoxide is heated in a reaction zone or reactor which is maintained at a temperature below the temperature at which a shift reaction takes place and above the temperature at which the methanation reaction takes place. The temperature is to be below shift reaction temperatures since the reverse shift reaction is to be avoided because it produces carbon monoxide and consumes hydrogen:

$$H_2 + CO_2 \longrightarrow CO + H_2O \quad (5)$$

Desirably, the temperature of the methanation reaction is maintained at a temperature below 250° C. to avoid the reverse shift and above ambient temperatures to promote the methanation of carbon monoxide.

Our reaction is carried out in the presence of a methanation catalyst, preferably a low-temperature type, which will assist in the selective methanation of carbon monoxide and hydrogen in order to substantially eliminate the presence of carbon monoxide in the gaseous mixture. By selective methanation is meant that essentially only CO and no measurable $CO_2$ reacts with the $H_2$ to form $CH_4$. We have discovered that methanation catalysts useful in our process are limited, and include only certain of the noble metal catalysts such as ruthenium and rhodium or an alumina support. Palladium and platinum do not selectively methanate CO as above defined. The preferred catalyst is ruthenium on alumina of composition 0.5% Ru deposited in a conventional manner on ⅛ inch $Al_2O_3$ pellets. The catalyst can be deposited on the support from a solution of metal compound and reduced to the metal Suitable ranges for catalyst metal are 0.01 to 5 weight percent of the finished catalyst (metal on support) and a more preferred range is 0.05 to 2 weight percent. The catalysts are commercially available from Englehard Industries Inc.

The space velocity of the gaseous mixture through the reaction zone is to be matched to the temperature conditions during the methanation reaction, in order to provide the desired reduction in carbon monoxide. Higher space velocities are desirably used since a more efficient use of the catalyst results. We have observed that for a given feed gas, the critical temperature range is shifted somewhat higher as the feed gas average space velocity is increased (s.c.f./hr.-cu. ft. catalyst), and also as the feed gas water vapor content is increased.

By following our novel procedure, the proportion of carbon monoxide in the gaseous mixture may be reduced, for example, from about 3,000 p.p.m. to about 75 p.p.m. and even lower; at such a level the carbon monoxide does not adversely affect noble metal electrodes of acid fuel cells. This is an important accomplishment in the preparation of low-cost hydrogen which is of sufficient purity to be used in an acid-type fuel cell.

The gaseous mixture treated by our methanation process is conveniently derived from a readily available hydrocarbon fuel, such as methane, but may also be liquid up to 500° F. boiling point. The hydrocarbon fuel may be first subjected to the well-known reforming reaction, wherein reaction with steam provides hydrogen and a substantial proportion of carbon monoxide. In order to reduce the quantity of carbon monoxide present, it is common practice to subject the effluent from the reforming reactor to the well-known shift reaction, wherein carbon monoxide reacts with steam to provide carbon dioxide and hydrogen. Although the shift reaction substantially reduces the amount of carbon monoxide present, the combination of the reforming and shift reactions fails to render the mixture of gases suitable for introduction into an acid fuel cell, since the carbon monoxide content is still too high. Desirably, the reforming and shift reactions are to provide a gaseous mixture, including hydrogen, wherein the carbon monoxide content is reduced to a low level, preferably below about 3,000 p.p.m. prior to subjecting the gaseous mixture to our methanation process. Although the reforming and shift reactions themselves are well known, when these reactions are combined with our methanation process, a highly economical, continuous process is provided for recovering hydrogen from a hydrocarbon fuel. After a hydrocarbon fuel, as methane, is subjected to reforming and shift reactions, the effluent gas mixture of hydrogen, carbon dioxide, carbon monoxide may be treated by our methanation process without the necessity of intermediate steps, as was previously considered necessary.

FIG. 3 illustrates the expected reactivity of $CO_2$ in a gas typical of the reformed feed gas used herein containing (in mole percentages) 19.37% $CO_2$, 77.21% $H_2$, 0.29% CO, and 3.13% $H_2O$. The theoretical equilibrium concentrations at various temperatures (in degrees Kelvin) are calculated for the reactions identified in equations (1) and (2) above, and the curves plotted on FIG. 3. Mole percentage values for all the curves except $H_2O$ relate to the left-hand vertical axis (0 to 32) while the mole percentages of the upper curve of $H_2O$ relate to the right-hand vertical axis. Of particular interest is the curve for $CO_2$ which shows that in the critical range of this invention, 100–220°C. (373–493° K.) and more particularly 120–220° C. (393–493° K.), one would expect about 18.8 percent of the original 19.37% $CO_2$ is methanated. Thus, the selective methanation discovered for the catalysts used herein is unexpected in view of such calculable equilibrium values.

The following examples more fully illustrate our invention, but it is to be understood that the various conditions and materials utilized are not to be considered as a limitation of the invention, rather it is intended that all equivalents obvious to those having skill in the art are to be included within the scope of the invention as claimed.

EXAMPLE I

A feed gas of composition 80 mole percent $H_2$, 19.7 mole percent $CO_2$ and 0.27 mole percent CO was reacted at various temperatures to ascertain the critical temperature range for methanation using a 0.5 percent rhodium catalyst on alumina. The gas was dry and the space velocity was 500 s.c.f./hr.-cu. ft. catalyst. The CO was determined using a Mine Safety Appliances Co. Lira infrared analyzer having a sensitivity of about 2 p.p.m. Values for the CO content at the methanation reactor outlet are plotted in FIG. 4 against temperature. The sharp drop in the CO curve shows the methanation is restricted to the temperature range of 150–220° C. No gross methanation of $CO_2$ was observed and thus the outlet $CO_2$ is shown as substantially identical throughout in the form of a hatched band, the width of which represents the usual margin of measurement error for apparatus used to measure $CO_2$.

EXAMPLE II

Using a gas composition of 80 mole percent hydrogen, 19.7 mole percent carbon dioxide, and 0.3 mole percent carbon monoxide, a number of methanation experiments were conducted with a catalyst of 0.5% Ru deposited on ⅛ inch alumina pellets. The effluent gas composition was analyzed chromatographically with a Fisher-Gulf partitioner, using a charcoal column, and also with a Mine Safety Appliances Co. Lira infrared analyzer; with the infrared analyzer, carbon monoxide was determined within an accuracy of about 10 p.p.m. A variety of parameters were studied, including excess water, and the results are shown in the table, from which FIGS. 1 and 2 were generated. The excess water tests were made to ascertain at what stage in the hydrogen generation system it would be most favorable to remove water.

The values labeled input indicate that no methanation reaction occurred at the given run temperatures so the $CO_2$ content was the same at the input and outlet.

In FIG. 1, the carbon monoxide content of the exit gas is seen as a function of temperature for the case of 2 mole percent water vapor in the feed. Distinct minimums of carbon monoxide content, about 100 are seen. At increased space velocities, although the same minimum carbon monoxide contents are obtained, higher temperatures are required. In FIG. 2, the same parameters are studied with a feed gas containing 15 percent water vapor. Again, the minimum carbon monoxide concentrations are obtained, but at slightly higher temperatures. Also, at minimum carbon monoxide content, no appreciable conversion of carbon dioxide to methane occurred; hence, the reaction is highly selective. The average output gas composition was found to have 79.5 mole percent $H_2$, 20.2 mole percent $CO_2$, 100 p.p.m. CO, and 0.3 mole percent $CH_4$. The input and output values for $CO_2$ are considered identical within the margin of measurement error of ±0.5 percent. Since constant, the $CO_2$ outlet values are not plotted in FIGS. 1 and 2.

EXAMPLE III

A natural gas, containing about 95 %, methane, and 5 percent higher hydrocarbons was passed through a sulfur removal cartridge and was fed to the first reactor stage. The input gas composition in detail was (in mole percentages): $N_2$ 0.19% $CO_2$ 0.59%, $H_2$ 0.01%, $CH_4$ 95.44%, $C_2H_6$ 2.81%, $C_3H_8$ 0.63%, Normal-$C_4H_{10}$ 0.11%, iso-$C_4H_{10}$ 0.12%, $C_5H_2$ 0.05% $C_6H_{14}$ 0.03%, and $C_7H_{16}$ 0.02%, This gas was there reformed in the presence of excess steam (steam to gas mole ratio of 7.3:1) at a space velocity of 250 s.c.f. per cubic foot of catalyst per hour at 800° C. The catalyst was the commercially available Girdler G-56 nickel-base catalyst. The effluent from this reactor was fed to a shift reactor operating a space velocity of 500 s.c.f. per cubic foot of catalyst (Girdler G-66 B) per hour at 270° C. The effluent from this stage was then fed to a condenser where a portion of the excess water was removed and the remaining gas composition mixture was fed to the methanation reactor, operated at a space velocity of 1,000 s.c.f. per cubic foot of catalyst per hour and at a temperature of 190° C. The catalyst used was a ruthenium on alumina catalyst as described in example II. The total system pressure drop was 4 inches of water.

TABLE

| Series | Run | T., °C. | S.V., s.c.f./hr., cu. ft. catalyst | Outlet gas composition (mole percent; water free basis) | | |
|---|---|---|---|---|---|---|
| | | | | CO | $CO_2$ | $CH_4$ |
| A. 2% $H_2O$ in feed; S.V. about 500 | 1 | 70 | 537 | 0.33 | Input | |
| | 2 | 151 | 551 | 0.026 | 20.1 | 0.16 |
| | 3 | 151 | 551 | 0.088 | 20.2 | 0.10 |
| | 4 | 157 | 547 | 0.0120 | 20.2 | 0.35 |
| | 5 | 170 | 558 | 0.0135 | 19.9 | 0.59 |
| | 6 | 128 | 553 | 0.31 | Input | 0.01 |
| | 7 | 147 | 524 | 0.22 | 19.7 | 0.03 |
| | 8 | 156 | 508 | 0.16 | 20.1 | 0.08 |
| | 9 | 168 | 502 | 0.015 | 20.1 | 0.62 |
| | 10 | 183 | 523 | 0.0117 | 20.0 | 1.20 |
| | 11 | 203 | 554 | 0.0225 | 20.0 | 2.32 |
| B. 2% $H_2O$ in feed; S.V. about 1,000 | 12 | 155 | 949 | 0.17 | 20.1 | 0.08 |
| | 13 | 169 | 971 | 0.016 | 20 | 0.24 |
| | 14 | 172 | 966 | 0.0117 | 20 | 0.31 |
| | 15 | 169 | 968 | 0.0117 | 20 | 0.30 |
| | 16 | 175 | 995 | 0.0128 | 20 | 0.38 |
| C. 2% $H_2O$ in feed; S.V. about 2,000 | 17 | 167 | 1,835 | 0.270 | Input | 0.06 |
| | 18 | 187 | 2,035 | 0.019 | 20.2 | 0.31 |
| | 19 | 203 | 1,950 | 0.015 | 20 | 0.55 |
| D. 15% $H_2O$ in feed; S.V. about 960 | 20 | 125 | 938 | 0.34 | Input | |
| | 21 | 159 | 933 | 0.22 | 20 | 0.03 |
| | 22 | 188 | 925 | 0.0160 | 20.2 | 0.31 |
| | 23 | 200 | 925 | 0.0160 | | |
| | 24 | 220 | 925 | 0.0200 | | |
| E. 15% $H_2O$ in feed; S.V. about 500 | 25 | 138 | 512 | 0.119 | 20.1 | 0.036 |
| | 26 | 162 | 518 | 0.0285 | 20 | 0.18 |
| | 27 | 220 | 511 | 0.025 | 19.6 | 3.62 |
| | 28 | 169 | 507 | 0.0117 | 20.2 | 0.302 |
| | 29 | 157 | 500 | 0.0103 | 20 | 0.18 |
| | 30 | 192 | 516 | 0.0155 | 20.1 | 1.01 |

The product gas was analyzed to be 78 mole percent carbon dioxide, 0.3 mole percent methane, 2 mole percent water and 8 p.p.m. carbon monoxide. The carbon monoxide was analyzed on a special MSA Lira Infrared analyzer with a sensitivity of 2 p.p.m.

What we claim and desire to secure by Letters Patent is:

1. A process for selectively methanating carbon monoxide in a mixture of gases consisting essentially of hydrogen, carbon dioxide, and carbon monoxide, the quantity of carbon dioxide being high relative to the quantity of carbon monoxide, said process comprising the step of selectively converting substantially all the carbon monoxide to methane in the presence of said carbon dioxide by heating said mixture of gases at a temperature of about 100–250° C. in the presence of a methanation catalyst selected from the metals ruthenium and rhodium, and said metals on a catalyst support.

2. A process as in claim 1 wherein said gases mixture is heated to a temperature of between about 150–220° C.

3. A process as in claim 1 wherein said methanation catalyst is ruthenium on an alumina support.

4. A process as in claim 1 wherein said mixture of gases is passed in contact with said methanation catalyst at a space velocity of between about 500–3,000 s.c.f. per hr.-cu. ft. catalyst.

5. A process as in claim 4 wherein said mixture of gases includes water vapor.

6. A process as in claim 5 wherein said heating is maintained at a temperature that is increased within said range as the percentage of water vapor is increased.

7. A process as in claim 6 wherein said temperatures and space velocities range from 140° C. and 500 s.c.f. per hr.-cu. ft. catalyst respectively, for a feed gas containing about 2 mole percent water vapor to 220° C. and 2,000 s.c.f./hr.-cu. ft. catalyst respectively, for a feed gas containing about 15 mole percent water vapor.

8. A process as in claim 1 wherein said mixture of gases is passed in contact with said methanation catalyst at a space velocity proportional to the temperature of said gases mixture.

9. A process as in claim 1 wherein said mixture of gases includes water vapor.

10. A process as in claim 9 wherein said heating is maintained at a temperature that is increased within said range as the percentage of water vapor is increased.

11. A process for producing a hydrogen-rich gas suitable for use in a fuel cell comprising the steps of:
   1. steam reforming a hydrocarbon fuel to produce a gas containing CO, $CO_2$, $H_2O$, $H_2$ and substantially no $O_2$,
   2. heating said gas in the presence of a water-gas shift catalyst to reduce the CO content to about 3,000 p.p.m.
   3. removing water vapor from said gas effluent from step 2 to between about 0 and 20% $H_2O$,
   4. selectively methanating the CO is said gas effluent from step 3 in the presence of a catalyst selected from ruthenium and rhodium on an alumina support in a temperature range of about 120–220° C. in a space velocity range of from about 500–3,000 s.c.f./hr.-cu. ft. catalyst, whereby a gas rich in hydrogen and containing $CO_2$, and $CH_4$ and less than about 100 p.p.m. CO suitable for use in an acid fuel cell is produced.